(12) United States Patent
Brandsma et al.

(10) Patent No.: US 10,302,468 B2
(45) Date of Patent: May 28, 2019

(54) CALIBRATION METHOD, CALIBRATION DEVICE AND MEASUREMENT DEVICE

(71) Applicant: NXP B.V., Eindhoven (NL)

(72) Inventors: Ewout Brandsma, Eindhoven (NL); Maarten Christiaan Pennings, Waalre (NL); Aly Aamer Syed, Deurne (NL); Timo van Roermund, Eindhoven (NL)

(73) Assignee: NXP B.V., Eindhoven (NL)

( * ) Notice: Subject to any disclaimer, the term of this patent is extended or adjusted under 35 U.S.C. 154(b) by 1101 days.

(21) Appl. No.: 13/762,244

(22) Filed: Feb. 7, 2013

(65) Prior Publication Data

US 2013/0211761 A1 Aug. 15, 2013

(30) Foreign Application Priority Data

Feb. 10, 2012 (EP) .................................... 12154988

(51) Int. Cl.
*G01D 18/00* (2006.01)
*G06F 17/00* (2019.01)
(Continued)

(52) U.S. Cl.
CPC ............. *G01D 18/00* (2013.01); *G01D 21/00* (2013.01); *G05B 19/0423* (2013.01); *G06F 17/00* (2013.01)

(58) Field of Classification Search
CPC ........ G01D 18/00; G01D 21/00; G06F 17/00; G05B 19/0423
See application file for complete search history.

(56) References Cited

U.S. PATENT DOCUMENTS 6,233,532 B1  5/2001  Boudreau et al.
6,662,130 B1  12/2003  Peel, III
(Continued)

FOREIGN PATENT DOCUMENTS

DE  10 2006 024 743 A1  6/2007
DE  10 2007 024423 A1  11/2008
(Continued)

OTHER PUBLICATIONS

Lau, Lazy Calibration for Wireless Sensor Networks, Harvards University, 2008.*
(Continued)

*Primary Examiner* — Stephanie E Bloss
*Assistant Examiner* — Lisa E Peters

(57) ABSTRACT

According to an aspect of the invention a method for calibrating a measurement device is conceived wherein: a calibration device is brought into close proximity of the measurement device such that a data communication link is established between the measurement device and the calibration device; wherein the following steps are performed while the calibration device and the measurement device are in close proximity of each other: the calibration device performs a measurement of at least one physical phenomenon; the measurement device performs a measurement of the same physical phenomenon; the result of the measurement by the measurement device is compared with the result of the measurement by the calibration device; and calibration parameters are computed based on a difference between the result of the measurement by the measurement device and the result of the measurement by the calibration device.

15 Claims, 2 Drawing Sheets

(51) Int. Cl.
*G05B 19/042* (2006.01)
*G01D 21/00* (2006.01)

(56) References Cited

U.S. PATENT DOCUMENTS

| | | | |
|---|---|---|---|
| 6,667,690 B2* | 12/2003 | Durej | G05B 15/02 340/3.1 |
| 6,792,370 B2 | 9/2004 | Satoh et al. | |
| 7,183,102 B2 | 2/2007 | Monfre et al. | |
| 7,289,924 B2 | 10/2007 | Muniraju et al. | |
| 8,988,223 B2* | 3/2015 | Puleston | H04L 67/04 340/10.1 |
| 2003/0115930 A1* | 6/2003 | Kappi | G01C 19/56 73/1.37 |
| 2004/0128097 A1* | 7/2004 | LaMarca | G01D 9/005 702/104 |
| 2005/0199716 A1* | 9/2005 | Shafer | G06Q 10/08 235/385 |
| 2006/0030353 A1* | 2/2006 | Jun | H04W 52/0235 455/550.1 |
| 2007/0029388 A1* | 2/2007 | Liu | G01F 25/0007 235/462.13 |
| 2007/0270672 A1* | 11/2007 | Hayter | A61B 5/14514 600/309 |
| 2008/0234935 A1* | 9/2008 | Wolf | G01C 21/16 701/472 |
| 2008/0291009 A1 | 11/2008 | Nelson et al. | |
| 2009/0204340 A1* | 8/2009 | Feldman | A61B 5/14532 702/19 |
| 2010/0277363 A1* | 11/2010 | Kainulainen | G01S 3/023 342/174 |
| 2011/0014933 A1* | 1/2011 | Karmarkar | H04M 1/72547 455/466 |
| 2011/0136550 A1* | 6/2011 | Maugars | H04B 5/0037 455/573 |
| 2011/0169606 A1 | 7/2011 | Brandsma | |
| 2011/0264543 A1* | 10/2011 | Taveau | G06Q 20/12 705/23 |
| 2013/0076491 A1 | 3/2013 | Brandsma et al. | |
| 2013/0141223 A1 | 6/2013 | Brandsma et al. | |
| 2013/0198813 A1 | 8/2013 | van Roermund et al. | |

FOREIGN PATENT DOCUMENTS

| | | |
|---|---|---|
| EP | 1 640 837 A2 | 3/2006 |
| EP | 2 138 919 A1 | 12/2009 |
| WO | 2007/005020 A1 | 1/2007 |

OTHER PUBLICATIONS

"Wi-Fi Simple Configuration Technical Specification—Version 2.0. 0", Wi-Fi Alliance, 154 pgs, retrieved from the Internet at: https://www.wi-fi.org/knowledge-center/published-specifications (Dec. 2010).

"NFC Forum Connection Handover", NFC Forum, 27 pgs, retrieved from the Internet at: http://www.nfc-forum.org/specs/spec_list/ (Jul. 7, 2010).

"Calibration" Wikipedia, 7 pgs, retrieved from the Internet at Feb. 7, 2013: http://en.wikipedia.org/wiki/Calibration.

Extended European Search Report for Patent Appln. No. EP12154988.5 (Jul. 24, 2012).

* cited by examiner

CALIBRATION METHOD, CALIBRATION DEVICE AND MEASUREMENT DEVICE

CROSS-REFERENCE TO RELATED APPLICATIONS

This application claims the priority under 35 U.S.C. § 119 of European patent application no. 12154988.5, filed on Feb. 10, 2012, the contents of which are incorporated by reference herein.

FIELD OF THE INVENTION

The invention relates to a method for calibrating a measurement device. The invention also relates to a computer program product, a calibration device and a measurement device.

BACKGROUND OF THE INVENTION

Electronic measurement devices typically comprise one or more sensors which are arranged to sense at least one physical phenomenon. This physical phenomenon may be a voltage, a current, a temperature, a humidity-level, a $CO_2$-level, a pH-value, and atmospheric pressure, for example. Besides the sensors electronic measurement devices typically comprise signal conditioning, conversion and processing circuitry. In addition, the measurement devices comprise interfaces for conveying the results of measurements of physical phenomena to a user. These interfaces may consist of a display or a wired or wireless communication link. The user could, for example, be a person or an autonomous control or monitoring system controlling or monitoring the physical phenomena in a certain environment, such as a smart building.

Most measurement devices require some form of calibration. Calibration may be defined as follows: "Calibration is a comparison between measurements—one of known magnitude or correctness made or set with one device and another measurement made in as similar a way as possible with a second device. The device with the known or assigned correctness is called the standard. The second device is the unit under test, test instrument, or any of several other names for the device being calibrated."(http://en.wikipedia.org/wiki/Calibration).

In the context of the present application the first device is called the "calibration device" and the second device is called the "measurement device". It is noted that a calibration device may in fact be regarded as a specific type of measurement device which has an already known or assigned correctness, whereas the extent to which a general measurement device is correct or incorrect must still be determined. A determined degree of incorrectness—or deviation—is used to compute so-called calibration parameters. Subsequently, during normal operation, a measurement device uses the calibration parameters to correct sensor values into more accurate measurements. Correcting these sensor values is typically done by processing circuitry within the measurement device.

Calibration may be needed during the manufacturing of the measurement device as well as during its normal operation, for example periodically. The former need may be caused by tolerances in the fabrication process of sensor, signal conditioning circuitry and/or signal conversion circuitry and the latter may be caused by lifetime aging of these components.

A wireless sensor node is an example of an electronic measurement device that may require calibration. As its name indicates, a wireless communication link is used as means to convey measurement results to a user. The user may be a person, but it may also be an automated control or monitoring system. In many applications wireless sensor nodes may be combined into large wireless sensor networks (WSNs). For example, it is expected that in the future modern office buildings will comprise up to one sensor per square meter to ensure optimal comfort for its inhabitants at the expense of minimal energy. This means that a WSN in such buildings may span thousands of nodes, i.e. measurement devices. Similar developments are anticipated in other applications such as infrastructural monitoring, health care, and agriculture.

Unfortunately, the calibration of a measurement device may be time-consuming and error prone. When thousands of measurement devices—such as wireless sensor nodes in buildings—must be calibrated periodically, the costs of calibration may be substantial. Therefore, there is a need to reduce the calibration effort to a single and relatively simple end-user action.

Furthermore, if different calibration devices and/or procedures are required for different types of measurement devices, the task of calibrating a large number of such measurement devices is quite complicated. For example, different wireless sensor nodes addressing different physical phenomena in a building all need to be calibrated. There is a need to reduce the calibration efforts also in these cases.

SUMMARY OF THE INVENTION

It is an object of the invention to reduce calibration efforts of the kind set forth to single and relatively simple end-user actions. This is achieved by a method, a computer program product, a calibration device, and a measurement device as set forth in the claims.

According to an aspect of the invention a method for calibrating a measurement device is conceived wherein: a calibration device is brought into close proximity of the measurement device such that a data communication link is established between the measurement device and the calibration device; wherein the following steps are performed while the calibration device and the measurement device are in close proximity of each other: the calibration device performs a measurement of at least one physical phenomenon; the measurement device performs a measurement of the same physical phenomenon; the result of the measurement by the measurement device is compared with the result of the measurement by the calibration device; calibration parameters are computed based on a difference between the result of the measurement by the measurement device and the result of the measurement by the calibration device.

According to an exemplary embodiment of the invention, the calibration device sends the result of its measurement to the measurement device, and the measurement device compares the result of the measurement by the measurement device and the result of the measurement by the calibration device and computes said calibration parameters.

According to a further exemplary embodiment of the invention, the measurement device comprises an RFID tag and a host controller which are connected to each other via a host connection, the calibration device comprises an NFC interface device or an active RFID device, and said data communication link is established between the RFID tag and the NFC interface device or active RFID device, and the result of the measurement by the calibration device is sent to the measurement device by writing said result into the RFID tag via said data communication link.

According to a further exemplary embodiment of the invention, the measurement device comprises an NFC interface device and a host controller which are connected to each other via a host connection, the calibration device comprises a further NFC interface device, and said data communication link is established between the NFC interface device and the further NFC interface device, and the result of the measurement by the calibration device is sent to the measurement device by sending said result to the NFC interface device via said data communication link.

According to a further exemplary embodiment of the invention, the measurement device sends the result of its measurement to the calibration device, the calibration device compares the result of the measurement by the measurement device and the result of the measurement by the calibration device and computes said calibration parameters, and the calibration device subsequently sends the calibration parameters to the measurement device.

According to a further exemplary embodiment of the invention, the measurement device comprises a machine-readable storage medium which comprises contact data of the measurement device, the calibration device comprises a reader device for contactless reading of said contact data from the machine-readable storage medium, and the calibration device establishes said data communication link via a wireless network interface using said contact data.

According to a further exemplary embodiment of the invention, the machine-readable storage medium is an RFID tag.

According to a further exemplary embodiment of the invention, the machine-readable storage medium is a QR-code, a barcode or a magnetic strip.

According to a further exemplary embodiment of the invention, the machine-readable storage medium further comprises cryptographic data for enabling secure communication via said wireless network interface.

According to a further exemplary embodiment of the invention, the measurement device and the calibration device comprise respective sensors for measuring said physical phenomenon.

According to a further exemplary embodiment of the invention, the measurement device is a wireless sensor node for use in a control system, in particular a building control system.

According to a further exemplary embodiment of the invention, a feedback signal is generated when the calibration has finished or when the calibration is expected to finish.

According to a further exemplary embodiment of the invention, the measurement device comprises an RFID tag for establishing said data communication link, and said RFID tag wakes up other parts of the measurement device after the data communication link has been established, such that the measurement device may perform subsequent steps of the method.

According to a further exemplary embodiment of the invention, an exchange of capabilities takes place between the measurement device and the calibration device before the respective measurements of the physical phenomenon are performed.

According to a further exemplary embodiment of the invention, the measurement of the physical phenomenon by the calibration device and the measurement of the same physical phenomenon by the measurement device are synchronized in time.

According to a further exemplary embodiment of the invention, the measurement device or the calibration device influences the physical phenomenon in order to optimize a calibration point and/or to obtain multiple calibration points.

According to a further aspect of the invention, a computer program product is conceived which comprises program elements executable by the measurement device or the calibration device, wherein each program element comprises program instructions which, when being executed by the measurement device and the calibration device, respectively, cause said measurement device and calibration device to carry out or control respective steps of a method of the kind set forth.

According to a further aspect of the invention a calibration device is conceived, in particular a portable calibration device, for use in a method of the kind set forth.

According to a further aspect of the invention a measurement device is conceived for use in a method of the kind set forth.

BRIEF DESCRIPTION OF THE DRAWINGS

The invention will be described in more detail with reference to the appended drawings, in which.

DESCRIPTION OF EMBODIMENTS

Figure 1:
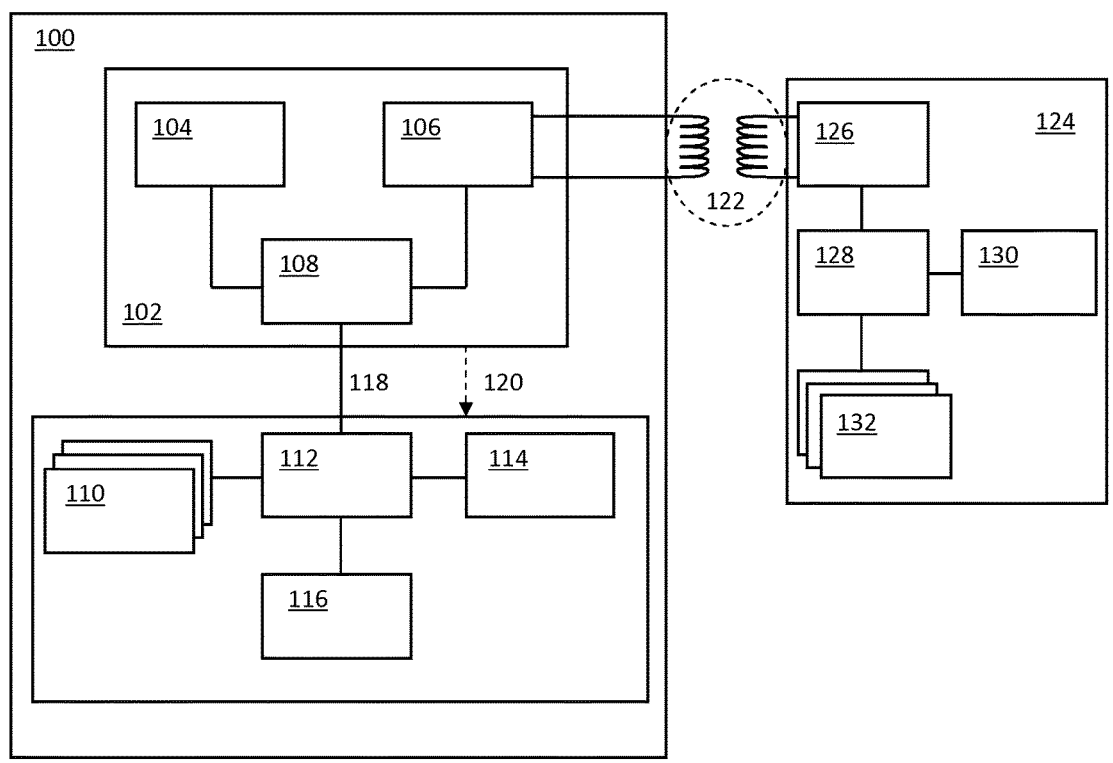
FIG. 1 illustrates a system wherein an exemplary embodiment of the calibration method according to the invention is used.

FIG. 1 illustrates a system wherein an exemplary embodiment of the calibration method according to the invention is used.

According to an exemplary embodiment of the invention the method for calibrating a measurement device by means of a calibration device comprises the following steps:
1. A user brings the calibration device and the measurement device in close proximity of each other.
2. A data communication link is established between the calibration device and the measurement device when they are in close proximity of each other. For example, such a close-proximity data communication link may be enforced by means of near-field communication, as will be explained in detail below.
3. The calibration device—comprising at least one sensor—performs a measurement of at least one physical phenomenon pertaining to its environment and sends the results of this measurement to the measurement device via the data communication link.
4. The measurement device—comprising one or more sensors, at least one of which senses the same physical phenomenon as the sensor of the calibration device—also performs a measurement of said physical phenomenon.
5. The measurement device compares the result of the measurement received from the calibration device with the result of its own measurement of said physical phenomenon.
6. The measurement device computes calibration parameters for its sensor using the compared measurement results.

It is noted that the chronological order of steps (3) and (4) may be interchanged or they may be performed simultaneously. However, it is important that steps (3) and (4) are performed relatively close in time such that the measured physical phenomenon does not change significantly between the respective measurements by the calibration device and the measurement device.

The close proximity of the calibration device and the measurement device may be enforced by using near-field communication as the data communication link or by using near-field communication to enable said data communication link. Near field communication (NFC) refers to a set of standards for mobile devices to establish radio communication with each other by bringing them into close proximity or by touching them together, usually no more than a few centimeters. Present and anticipated applications of NFC include contactless transactions, data exchange, and simplified setup of more complex communications such as Wi-Fi network setup. Communication is also possible between an NFC interface device and an unpowered chip, such as a passive RFID tag. NFC standards cover communications protocols and data exchange formats and are based on existing radio-frequency identification (RFID) standards including ISO/IEC 14443 and FeliCa. The standards include ISO/IEC 18092 and those defined by the NFC Forum, which was founded in 2004.

It should be noted that in the context of the present application bringing the calibration device and the measurement device into "close proximity" of each other also includes touching them together in the same way as typical NFC-enabled devices can be touched together—in this case the proximity is as close as physically possible.

The measurements of the physical phenomenon by both the calibration device and the measurement device take place while these devices are in close proximity of each other and hence while they are exposed to the same physical environment, which should yield the same values for corresponding physical phenomena. It is noted that this condition is typically true for physical phenomena such as temperature, gas concentrations (e.g. humidity and $CO_2$-level) and atmospheric pressure, while it may not be straightforward for direction- and position-sensitive phenomena such as, for example, ambient light level. In the latter case additional measures may be required to compensate for the fact that the physical environments of the calibration device and the measurement device cannot be regarded as substantially the same environment.

The skilled person will appreciate that it is not strictly necessary that the comparison of the measurements and the computation of the calibration parameters—i.e. step (5) and most of step (6)—are performed by the measurement device. Alternatively, the measurement device may send its measurements to the calibration device (instead of the other way around) and the calibration device may perform those steps. As a last step, the calibration device will then send the calibration parameters to the measurement device for subsequent storage therein.

In FIG. 1 a measurement device 100 is calibrated by means of a calibration device 124. In a typical smart building environment, for example, there will be many measurement devices, each to be calibrated separately, and only one or just a few portable calibration devices. The measurement device 100 comprises an RFID tag 102, one or more sensors 110, a host controller 112, a memory 116 and an interface 114 to convey measurements to the user.

For the sake of the brevity signal conditioning and conversion (e.g. analog-to-digital) circuitry is shown as part of the sensor block. The interface 114 or means to convey measurements to the user may, for example, be a wired or wireless network interface and/or a display. If the means to convey measurements is a wireless network interface, the measurement device could be a wireless sensor node. As discussed above, the user may be a person, but it may also be an automatic control or monitoring system.

According to this exemplary embodiment, the calibration device 124 comprises an NFC interface device or an active RFID device 126, one or more well-calibrated sensors 132, a controller 128 and a memory unit 130. Again, signal conditioning/conversion is shown as part of the calibrated sensors 132. The skilled person will appreciate that the actual sensors 132 themselves need not be calibrated, but that in such a case the controller 128 may compensate for deviations in sensor readouts using calibration parameters stored in the memory unit 130 of the calibration device 124. In the context of the present application these sensors are also referred to as calibrated sensors 132.

Both the measurement device 100 and the calibration device 124 may comprise more than one sensor, each sensor measuring a different physical phenomenon. For example, there could be sensors for measuring ambient temperature, humidity-level, atmospheric pressure and/or CO2-level. Also, again for example, there could be sensors for measuring ambient light and/or radiation temperature, but in that case additional instructions must be supplied to the end-user to make sure both devices are exposed to the same amount of light/radiation temperature while calibrating, which is slightly more elaborate, but still feasible.

Clearly, a sensor of the measurement device 100 can only be calibrated by means of the calibration device 124 if a corresponding sensor, i.e. a sensor for measuring the same physical phenomenon, is supported by the calibration device 124. Thus, the calibration device 124 and the measurement device 100 need to have at least one type of sensor in common, for example, they should both have a temperature sensor.

The RFID tag 102 of the measurement device 100 comprises a non-volatile memory 104, an RFID interface 106 and a tag controller 108. The tag controller 108 is connected to the host controller 112 by means of a host connection 118. The host connection 118 enables the host controller 112 to read from—and optionally write into—the non-volatile memory 104 of the RFID tag 102. The RFID interface 106 enables the calibration device 124 to write into—and optionally read from—the non-volatile memory 104 in a contactless fashion. Optionally, the RFID tag 102 may be enabled to trigger and/or wake-up the rest of the measurement device 100 when an interaction with the calibration device 124 has taken place (which may or may not have changed any—or specific—contents in the non-volatile memory 104).

According to an exemplary embodiment of the invention the calibration method comprises the following steps:
1. A user brings the calibration device 124 and the measurement device 100 in close proximity of each other.
2. The NFC interface device or active RFID device 126 of the calibration device 124 detects the RFID interface 106 of the RFID tag 102 of the measurement device 100 and informs the controller 128 of the calibration device 124, thereby establishing a data communication link.
3. The controller 128 of the calibration device 124 instructs at least one sensor 132 to perform a measurement of a physical phenomenon in the environment and subsequently instructs the NFC interface device or active RFID device 126 to write the result of this measurement into the non-volatile memory 104 of the RFID tag 102 of the measurement device 100 through the RFID interface 106 of the RFID tag 102.
4. The host controller 112 of the measurement device 100 detects that a new measurement value has been written into the non-volatile memory 104 of the RFID tag 102 and, in response thereto, instructs a sensor 110 which measures the same physical phenomenon to perform a measurement of said physical phenomenon as well.

5. The host controller 112 of the measurement device 100 compares the result of the measurement done and communicated by the calibration device 124 with the result of its own measurement of the same physical phenomenon.

6. The host controller 112 of the measurement device 100 computes calibration parameters for the sensor 110 which measures said physical phenomenon using the compared measurement results and stores these calibration parameters into the memory unit 116 of the measurement device 100.

During normal operation, the measurement device 100 uses those calibration parameters to compensate for deviations in sensor readouts when performing measurements. Typically, this implies that the memory unit 116 used for storing the calibration parameters must also be persistent. Therefore, it is an option to use the non-volatile memory 104 of the RFID tag 102 for this purpose, rather than the memory unit 116. In this case, the calibration parameters are also available for inspection by any NFC-enabled device, which may be beneficial.

According to an alternative embodiment the RFID tag 102 of the measurement device 100 may be replaced by an NFC interface device. It may then communicate in peer-to-peer mode with the NFC interface device 126 of the calibration device 124 or the calibration device 124 may now contain an RFID tag instead of an NFC interface device, which essentially reverses the roles of the calibration device 124 and the measurement device 100 as far as the communication is concerned. However, since the cost and power usage of an RFID tag are normally lower than those of an NFC interface device, implementing an RFID tag in the (many) measurement devices and a full-blown NFC interface device in the (few) calibration devices is usually more attractive.

Figure 2:
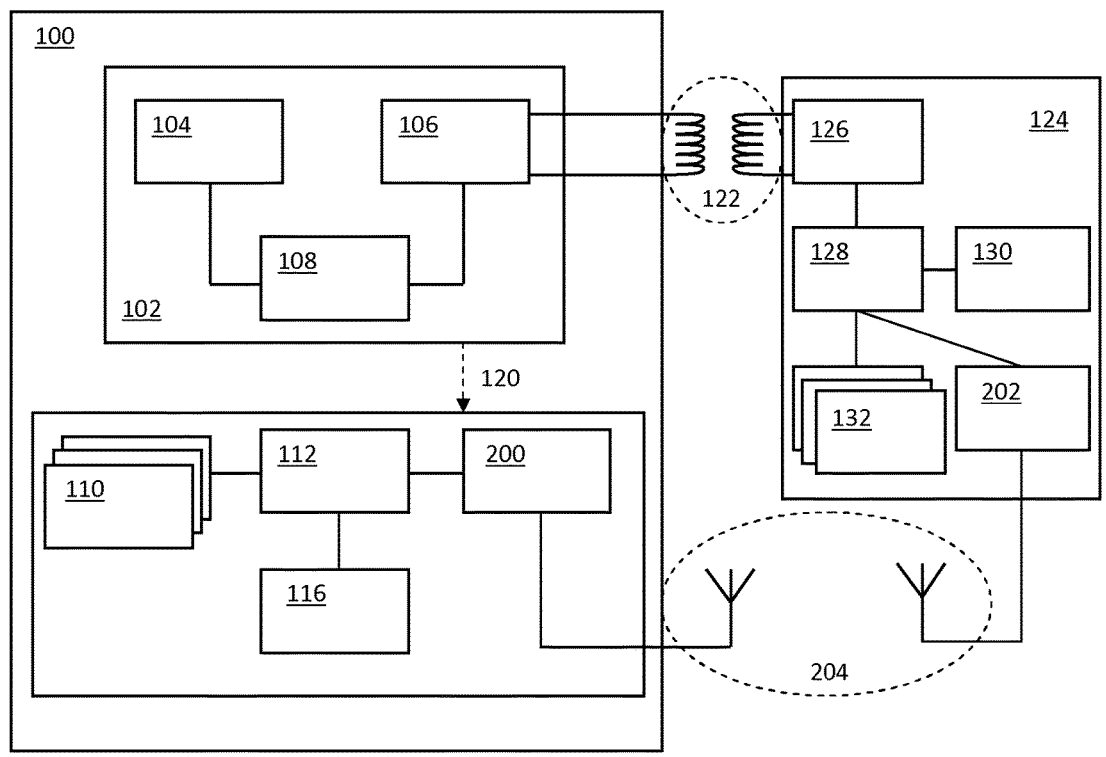
FIG. 2 illustrates a system wherein a further exemplary embodiment of the calibration method according to the invention is used.

FIG. 2 illustrates a system wherein a further exemplary embodiment of the calibration method according to the invention is used.

The system depicted in FIG. 2 is similar to the system depicted in FIG. 1. The most notable difference is the fact that the measurement device comprises an RFID tag 102 without a host connection. Thus, the RFID tag 102 is not a so-called "Connected Tag". In this system, no wired connection is provided between the tag controller 108 and the host controller 112. Therefore, the host controller 112 has no access to the non-volatile memory 104 of the RFID tag 102. The NFC interface device or active RFID device 126 of the calibration device 124 must be able to read the contents of the non-volatile memory 104 of the RFID tag 102 of the measurement device 100 through the RFID interface 106.

A benefit of an RFID tag 102 without a host connection is that not having a wire between the RFID tag 102 and the rest of the measurement device 100 lowers cost and simplifies physical design. For example, in this case the RFID tag 102 may take the shape of an RFID-sticker attached to the housing of the measurement device 100.

As a consequence of not having a host connection, other means for sending the measurement results from the calibration device 124 to the measurement device 100 are needed. In order to retain the simplicity of the calibration procedure—so that the end-user merely has to bring the measurement device 100 and the calibration device 124 in close proximity of each other—it is preferred for those means to be wireless. Therefore, both the measurement device 100 and the calibration device 124 additionally comprise a wireless network interface 200, 202. Ideally, these wireless network interfaces 200, 202 should be compatible, although solutions with an intermediate gateway device (not shown) are also conceivable. For example, the calibration device 124 may support Wi-Fi, the measurement device 100 may support Zigbee and a gateway could provide a translation. In this example, it is assumed that the wireless network interface 200 of the measurement device 100 also functions as a means to convey measurement results to a user and therefore no alternative or additional means (such as a display) are shown. Nevertheless, such alternative or additional means would certainly be possible.

According to this exemplary embodiment of the invention the calibration method comprises the following steps:

1. A user brings the calibration device 124 and the measurement device 100 in close proximity of each other.

2. The NFC interface device or active RFID device 126 of the calibration device 124 detects the RFID tag 102 of the measurement device 100 and informs the controller 128 of the calibration device 124. The controller 128 of the calibration device 124 subsequently instructs the NFC interface device or active RFID device 126 to read contact data, such as a network address, from a predetermined location in the non-volatile memory 104 of the RFID tag 102 of the measurement device 100 through the RFID interface 106 of the measurement device 100.

3. The controller 128 of the calibration device 124 instructs at least one sensor 132 to perform a measurement of a physical phenomenon in the environment and subsequently instructs the wireless network interface 202 of the calibration device 124 to send the result of said measurement to the wireless network interface 200 of the measurement device 100 using said contact data.

4. The host controller 112 of the measurement device 100 receives the measurement result through the wireless network interface 200 and, in response, instructs a sensor 110 that measures the same physical phenomenon to perform a measurement of said physical phenomenon as well.

5. The host controller 112 of the measurement device 100 compares the result of the measurement done and communicated by the calibration device 124 with the result of its own measurement of the same physical phenomenon.

6. The host controller 112 of the measurement device 100 computes calibration parameters for the sensor 110 that measures said physical phenomenon using the compared measurement results and stores these calibration parameters into the memory unit 116 of the measurement device 100.

The contact data of the measurement device 100 as stored in its RFID tag 102 may comprise a network address such as a Media Access Control address (MAC address). In addition, the contact data may comprise cryptographic data which enable a secure transfer of the measurement data, i.e. which enable avoiding eavesdropping and tampering. It should be noted that only static information can be stored in the RFID tag 102, because the host controller 112 has no means to update the data. For example, it makes no sense to store a dynamically allocated network address in the RFID tag 102. The mechanism to set up a connection using static data stored in an RFID tag is known as such.

The skilled person will appreciate that any machine-readable storage medium attached to the housing of the measurement device 100 may be used to store the contact data. For example, a barcode, a QR-code, or a magnetic strip may be used instead of the RFID tag 102. In those cases, the calibration device 124 should be equipped with a compatible reader device instead of the NFC interface device or active RFID device 126. It is important, however, that the reading only takes place when the measurement device 100 and the calibration device 124 are in close proximity of each other.

It may be useful to feed back to the end-user that the calibration procedure has or will be completed successfully. Such feedback may, for example, take the form of an audible or visible signal, such as a beep or a blinking LED. If no feedback is given, the end-user knows that something went wrong and can try again or take other steps to resolve the problem. For example, the end-user may not have brought the measurement device 100 and the calibration device 124 in sufficiently close proximity of each other or may not have aligned them properly.

The feedback signal may be generated by the measurement device 100 after having completed step (6). However, in some cases this is not possible because the measurement device 100 may either not have feedback means (for example an LED or a beeper) or it may not have sufficient energy to generate such a signal. This could, for example, be the case when the measurement device 100 is an energy-harvesting wireless sensor node.

As an alternative, the feedback signal may be generated by the calibration device 124 after having completed step (3). At least when the calibration device 124 can verify that its measurement results have been received correctly by the measurement device 100, this may give sufficient confidence that the calibration procedure will indeed be completed successfully by the measurement device 100. However, this alternative does not provide complete certainty that the calibration procedure will be completed successfully.

As yet another alternative, the measurement device 100 may send a message to the calibration device 124 after having completed step (6) and the calibration device 124 may generate the feedback signal after having received this message. It is noted that sending a message may be done by writing into the RFID tag 102 in the system of FIG. 1 or by transmitting over the wireless network interface 200 in the system of FIG. 2. This alternative has the benefit that the feedback signal is generated only after successful completion of the calibration procedure, while not needing feedback means in the measurement device 100.

In the system depicted in FIG. 1 a wake-up signal 120 may be provided from the RFID tag 102 to other parts of the measurement device 100 as a result of the calibration device 124 writing the measurement result into the non-volatile memory 104 of the RFID tag 102 or, in other words, as a result of step (3) having been executed. The wake-up signal causes the measurement device 100 to proceed with steps (4) through (6). In other words, the wake-up signal is a means by which, at the start of step (4), the host controller 112 detects the writing of new measurement values.

Similarly, in the system depicted in FIG. 2 a wake-up signal 120 may be provided from the RFID tag 102 to the rest of the measurement device 100. This signal may wake-up and trigger the host controller 112 to start listening to the wireless network in order to receive the measurement result as described in step (4). Specifically, this is useful when the measurement device 100 is normally in an off or very low-power state and therefore not capable of reading the non-volatile memory 104 and listening to the network interface, respectively. For example, if the measurement device 100 is a wireless sensor node it may be in an off or very low-power state when the calibration device 124 initiates the calibration method. It is beneficial when the user performing the calibration procedure does not have to switch on the wireless sensor node by means of a button, i.e. the procedure is simpler and the cost of a button can be avoided. It is also not acceptable to leave the wireless sensor node in the on state permanently, because that would deplete its energy reserves. It is noted that wireless sensor nodes may use extreme duty cycling in order to operate on harvested energy. As a matter of fact, the time-span between a user pushing the button and subsequently bringing the calibration device and wireless sensor node in close proximity of each other may already be too long—typically seconds, rather than milliseconds—and cause depletion of its energy reserves even before calibration takes place.

By default, the calibration device 124 will perform measurements using one or more of its sensors 132 and subsequently the measurement device 100 will perform measurements using the one or more sensors 110 that measure the same physical phenomena. Normally, the calibration device 124 uses all of its available sensors 132. Alternatively, it is possible for the measurement device 100 to measure before or during the measuring process of the calibration device 124. In that case, the measurement device 100 will also, typically, perform measurements using all of its sensors 110.

In these cases it may happen that the calibration device 124 performs measurements for physical phenomena which are not supported by the measurement device 100 and, vice versa, that the measurement device 100 may perform measurements that are not supported by the calibration device 124. Such measurements have no merit, because they do not result in calibration parameters being computed. These measurements without merit may result in unnecessary and unwanted power consumption. This is particularly problematic if the measurement device is an energy-harvesting wireless sensor node.

Furthermore, the measurement device 100 may set additional requirements for a measurement relating to a specific physical phenomenon as performed by the calibration device 124. For example, the measurement may require a specific level of accuracy, it may require the measurement data to be encoded in a specific unit (e.g. degrees Celsius) and format, it may require the measurement to be synchronized in time with its own measurement of the same physical phenomenon (e.g. in case of fluctuating conditions in the environment) or it may require a specific spectral profile for an ambient light, radiation temperature, or sound measurement.

Therefore, according to a further exemplary embodiment of the invention, an exchange of capabilities between the calibration device 124 and the measurement device 100 may take place during—or directly after—establishing the data communication link, but before the actual measurements take place.

According to a first variant of this embodiment, the measurement device 100 first advertises the set of physical phenomena that it requires measurements for, together with any additional requirements (e.g. accuracy and unit/format) that it may have for those measurements. If this advertisement is static (i.e. each and every time identical), it may be pre-stored in the RFID tag 102. In the system of FIG. 2, the contact data is then effectively extended with the set of physical phenomena and the additional requirements. If this advertisement changes depending on, for example, when or how the last calibration for a particular physical phenomenon took place, it has to be written into the RFID tag 102 via the host connection 118 or via the wireless network interface 200 by the measurement device 100 before step (3) of the above-described exemplary embodiments of the calibration method takes place. The calibration device 124 may subsequently, as part of step (3), limit its measurements to the requested set of physical phenomena while taking the additional requirements into account. The calibration device 124 may only measure a subset of the requested set by not performing measurements for physical phenomena that it doesn't support or for which it cannot fulfill the requested additional requirements.

According to a second variant of this embodiment, the calibration device 124 first advertises the set of physical phenomena that it supports, together with any additional options that it supports for any of those phenomena (e.g. possible accuracy settings, possible units and formats, possible spectral settings, or the option to perform a time-synchronized measurement). This advertisement is done right after establishing the data communication link in step (2) by writing the advertisement into the RFID tag 102 using the RFID connection 122 or by transmitting it over the wireless network 204. Subsequently, the measurement device 100 will make a selection out of the advertised physical phenomena and the possible additional options, and it will reply to the calibration device 124 by writing into the RFID tag 102 using the host connection 118 or by transmitting over the wireless network 204. Subsequently, the calibration device 124 may only perform measurements for this set and subject to the additional options as part of step (3).

During calibration, it may be of relevance to a measurement device 100 to be aware of environmental conditions other than the physical phenomena it is capable of measuring itself. For example, sensor results may be influenced by temperature and humidity. In this case, the measurement device 100 can easily request measurements for those physical phenomena as well from a more capable calibration device.

The data format in which capabilities, i.e. the sets of physical phenomena plus additional requirements or options, are exchanged between the measurement device 100 and the calibration device 124 for either variant may be any machine-readable format, for example a specific XML-DTD format, as agreed upon and defined for this purpose.

As mentioned above, in case a physical phenomenon in the environment has the tendency to fluctuate in time relatively quickly—as compared to the duration of the calibration procedure—it may be beneficial for the measurements of that phenomenon by the calibration device 124 and the measurement device 100, respectively, to take place substantially simultaneously. There are various ways to implement this synchronization in time.

For example, the calibration device 124 and the measurement device 100 may agree upon an absolute moment in time (preferably in the very near future) to actually perform their respective measurements. This requires that the calibration device 124 and the measurement device 100 have access to a common (absolute) time base, such as GPS or an atomic clock transmitter. Alternatively, the calibration device 124 and the measurement device 100 may synchronize their clocks. It is noted that methods for clock synchronization are known as such.

Furthermore, one of the two devices, i.e. the measurement device 100 or the calibration device 124, may send a message "measure now" (parameterized by the applicable physical phenomenon) to the other device and may start measuring immediately. Upon receipt of that message the other device also starts measuring immediately. To ensure that the other device is ready to measure, this message exchange may be preceded by a handshake message exchange to make sure that both devices are ready to measure before the "measure now" message is sent.

In the above-described calibration methods, calibration parameters are computed based on a single measurement by both the calibration device 124 and the measurement device 100 for a particular physical phenomenon. This is referred to as single-point calibration. For a more accurate calibration, it may be necessary to compare measurements for the physical phenomenon at two or more values. This is referred to as multi-point calibration. Furthermore, the physical phenomenon is measured at whatever the environmental conditions (i.e. the value of the physical phenomenon) happen to be at the moment of calibration, which is not necessarily the optimal point to perform a (single-point) calibration.

An optional extension of the calibration method according to the invention involves the measurement device 100 or the calibration device 124 influencing at least one physical phenomenon in the environment to optimize the calibration point and/or to obtain multiple calibration points.

Thus, according to an exemplary embodiment of the invention, the measurement device 100 is a wireless sensor node equipped to control lighting, heating, ventilation and/or air-conditioning in a building. The measurement device 100 will transmit messages over its wireless network interface to controllers and/or actuators such as lighting luminaries, blinds or heaters to influence the measured physical phenomena in its environment. Whether this is a desirable solution depends on the type of physical phenomenon. For ambient light this may work very well, but for heating, ventilation and air-conditioning this may be less practical. For example, changing the temperature even by a few degrees—which might not even suffice for a proper multi-point calibration—costs a lot of energy and has a strong negative impact on the indoor climate.

Therefore, according to another exemplary embodiment of the invention, the calibration device 124 is equipped to communicate with a dedicated enclosure (not shown) in which the environmental conditions relating to some of the physical phenomena for which calibration is required can be controlled accurately, quickly, and without unnecessary energy expense or human discomfort. The enclosure may also form part of the calibration device 124. For example, the calibration device 124 could be a climate chamber where, for example, temperature, humidity, atmospheric pressure and/or $CO_2$-level can be accurately controlled. In this case, the measurement device 100 will be physically placed within the enclosure, for example on a pad containing the antenna of the NFC interface device or active RFID device 126 of the calibration device 124. The calibration device 124, i.e. the climate chamber, may optionally advertise its capabilities for setting calibration points.

In these exemplary embodiments the actuators in the environment and in the climate chamber, respectively, may need some time to reach the next calibration point. For example, it may take some time to heat the climate chamber up from a first temperature calibration point to a next temperature calibration point. In case the measurement device 100 is an energy-harvesting wireless sensor node or another type of measurement device 100 with a constrained energy supply, it may revert to an off or very low-power state in between subsequent measurements.

As an example, the steps of a method to perform multi-point temperature calibration on a measurement device, i.e. an energy-harvesting wireless sensor node, using a calibration device, i.e. a climate chamber, are outlined below. For the sake of brevity, only the calibration of a single physical phenomenon (i.e. temperature) is discussed. It is noted that this exemplary method combines the use of an RFID tag having a host connection with the optional extensions for end-user feedback (beep), automatic wake-up, capability discovery and multi-point calibration. The steps are as follows:

1. An end-user places the wireless sensor node inside the climate chamber on the pad and closes the door of the climate chamber.
2. The climate chamber detects the RFID tag of the wireless sensor node and writes its capabilities (capability data) into the RFID tag over the RFID interface. For the purpose of the example, it is assumed that those capabilities include the ability to measure temperature and to influence the temperature over a stated range. Also supported accuracies and units/formats may be expressed as part of the capability data written into the RFID tag.
3. The wireless sensor node is woken up from an off or very low-power state by the writing of the capability data into its RFID tag. Subsequently, it reads the capability data from the RFID tag and creates a request to measure the temperature at two or more different calibration points. The request may furthermore include information about required accuracy and unit/format. The wireless sensor node subsequently writes this request into the RFID tag and reverts to the off or very low-power state.
4. The climate chamber receives the request from the wireless sensor node by reading from the RFID tag over the RFID interface.
5. The climate chamber actuates its heating or cooling device to reach a temperature according to a first requested calibration point. The climate chamber waits until the required temperature is reached.
6. The climate chamber then measures the temperature with the required accuracy, encodes it in the required unit/format and writes this measurement data into the RFID tag of the wireless sensor node over the RFID interface.
7. The wireless sensor node is woken up from an off or very low-power state by the writing of the measurement data relating to the first calibration point into its RFID tag. Subsequently it reads the measurement data from the RFID tag and performs a temperature measurement using its own temperature sensor and stores both measurements in, for example, its non-volatile memory, and reverts to the off or very low-power state. It should be noted that the non-volatile memory may be really non-volatile or "virtually" non-volatile in the sense that a limited amount of power is fed into it, i.e. in order to retain the state of the memory between subsequent very low-power states of the wireless sensor node, for example.
8. Steps (5), (6), and (7) are repeated for a second calibration point and possibly further calibration points. In the last iteration, the wireless sensor node will complete comparing the corresponding measurement results, compute the calibration parameters, store them into its (non-volatile) memory and write a completion message into the RFID tag, before reverting to the off or very low-power state.
9. Upon detecting that the completion message has been written into the RFID tag, the climate chamber will output a feedback signal by generating a beep.

It is noted that in this example the wireless sensor node repeatedly reverts to an off or very low-power state in order to reduce its energy consumption to the bare minimum. It should also be noted that the process of a sensor performing a measurement may be a relatively lengthy procedure, for example compared to the speed at which the host controller executes instructions, particularly if a high accuracy is desired. A sampling or settling time of a hundred microseconds or more is no exception. The host controller and other components of the wireless sensor node could therefore also go to an off or very low-power state while the sensor is performing its measurement autonomously. However, this should be considered as an implementation concern of the sensor node, which is beyond the scope of the present invention. Furthermore, such a technique should also be employed during normal operation of the wireless sensor node and not only during its calibration.

The above-mentioned embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The invention may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 measurement device
102 RFID tag
104 non-volatile memory unit
106 RFID interface
108 tag controller
110 sensor, signal conditioner and converter
112 host controller
114 interface for conveying measurement result to user
116 memory unit
118 host connection
120 optional host wake-up
122 RFID connection
124 calibration device
126 NFC interface device or active RFID device
128 controller
130 memory unit
132 calibrated sensor, signal conditioner and converter
200 wireless network interface
202 wireless network interface
204 wireless network communication

The invention claimed is:

1. A method for calibrating a measurement device wherein:
a calibration device that includes a near-field communication (NFC) interface is brought into close proximity of a measurement device that includes a tag having a memory and an NFC interface such that the calibration device and the measurement device are exposed to the same physical environment wherein the measurement device is a wireless sensor node for use in a control system, such that an NFC communication occurs between the NFC interface of the calibration device and the NFC interface of the measurement device over an NFC data communication link;
wherein the following steps are triggered by the NFC communication between the NFC interface of the calibration device and the NFC interface of the measurement device:

the calibration device reads contact data from the memory of the tag via the NFC data communication link;
while the calibration device is in close proximity to the measurement device, the calibration device performs a measurement of at least one physical phenomenon;
the result of the measurement by the calibration device is communicated over a wireless data communication link to the measurement device from the calibration device, wherein the wireless data communication link is established using the contact data from the memory of the tag and using wireless interfaces that are different from the NFC interface of the measurement device and from the NFC interface of the calibration device;
while the calibration device is in close proximity to the measurement device and in response to receiving the result of the measurement performed by the calibration device, the measurement device performs a measurement of the same physical phenomenon;
at the measurement device, after the result of the measurement by the calibration device is communicated over the wireless data communication link to the measurement device from the calibration device, the result of the measurement by the measurement device is compared with the result of the measurement by the calibration device; and
at the measurement device, calibration parameters are computed based on the comparison between the result of the measurement by the measurement device and the result of the measurement by the calibration device;
at the measurement device, the calibration parameters are stored in a memory of the measurement device that is separate from the memory of the tag.

2. A method as claimed in claim 1, wherein the measurement device comprises a host controller and the tag has a controller, wherein the host controller of the measurement device and the controller of the tag have no wired connection.

3. A method as claimed in claim 1, wherein the memory of the tag further comprises cryptographic data for enabling secure communication via said wireless data communication link.

4. A method as claimed in claim 1, wherein the measurement device and the calibration device comprise respective sensors for measuring said physical phenomenon.

5. A method as claimed in claim 1, wherein a feedback signal is generated when the calibration has finished or when the calibration is expected to finish.

6. A method as claimed claim 1, wherein an exchange of capability data takes place between the measurement device and the calibration device before the respective measurements of the physical phenomenon are performed.

7. A method as claimed in claim 1, wherein the measurement of the physical phenomenon by the calibration device and the measurement of the same physical phenomenon by the measurement device are synchronized in time.

8. A method as claimed in claim 1, wherein the measurement device or the calibration device influences the physical phenomenon in order to at least one of optimize a calibration point and obtain multiple calibration points.

9. A non-transitory computer program product comprising program elements executable by the measurement device or the calibration device, wherein each program element comprises program instructions which, when being executed by the measurement device or the calibration device, respectively, cause said measurement device or calibration device to carry out or control respective steps of a method as claimed in claim 1.

10. A calibration device, for use in a method as claimed in claim 1.

11. A measurement device for use in a method as claimed in claim 1.

12. The method of claim 1, wherein the tag is a sticker that comprises the memory of the tag, a controller, and the NFC interface and wherein the sticker is attached to a housing of the measurement device.

13. The method of claim 1, wherein the tag is a sticker that comprises the memory of the tag, a controller, and the NFC interface and wherein the sticker is attached to a housing of the measurement device, and wherein the measurement device comprises a host controller, wherein the host controller of the measurement device and the controller of the tag have no wired connection.

14. A method for calibrating a measurement device, the method comprising:
bringing a calibration device to within a few centimeters of a measurement device, wherein the measurement device is a wireless sensor node for use in a control system that includes a tag attached to a housing of the measurement device, the tag comprising memory, a controller, and a near field communication (NFC) interface, the measurement device also including a sensor, a host controller, and a wireless network interface, wherein the tag is a sticker that comprises the memory of the tag, the controller, and the NFC interface, wherein the sticker is attached to the housing of the measurement device, and wherein the host controller of the measurement device and the controller of the tag have no wired connection, the calibration device including an NFC interface, a wireless network interface, a controller, and a sensor;
while the calibration device is within a few centimeters of the measurement device, detecting the tag and reading contact data from the memory of the tag using the NFC interface of the measurement device and the NFC interface of the calibration device;
while the calibration device is within a few centimeters of the measurement device and in response to detecting the NFC interface of the tag, via the sensor of the calibration device, performing a measurement of a physical phenomenon in the environment;
sending the result of the measurement from the wireless network interface of the calibration device to the wireless network interface of the measurement device using said contact data that was read from the memory of the tag;
while the calibration device is within a few centimeters of the measurement device and in response to receiving the result of the measurement performed by the calibration device, via the sensor of the measurement device, performing a measurement of the same physical phenomenon in the environment;
at the measurement device, comparing the result of the measurement from the calibration device with the result of the measurement from the measurement device and computing a calibration parameter based on the comparison; and
storing the calibration parameter in the memory of the measurement device.

15. The method of claim 14, wherein the contact data comprises a network address of the measurement device.

* * * * *